March 27, 1956

B. E. SYKES 2,739,837

TRAVEL HOIST CARRIAGE FOR DUMP TRUCKS

Filed Aug. 13, 1954

INVENTOR.
BENJAMIN E. SYKES
BY

*McMorrow, Berman & Davidson*
ATTORNEYS

March 27, 1956 B. E. SYKES 2,739,837
TRAVEL HOIST CARRIAGE FOR DUMP TRUCKS
Filed Aug. 13, 1954 2 Sheets-Sheet 2
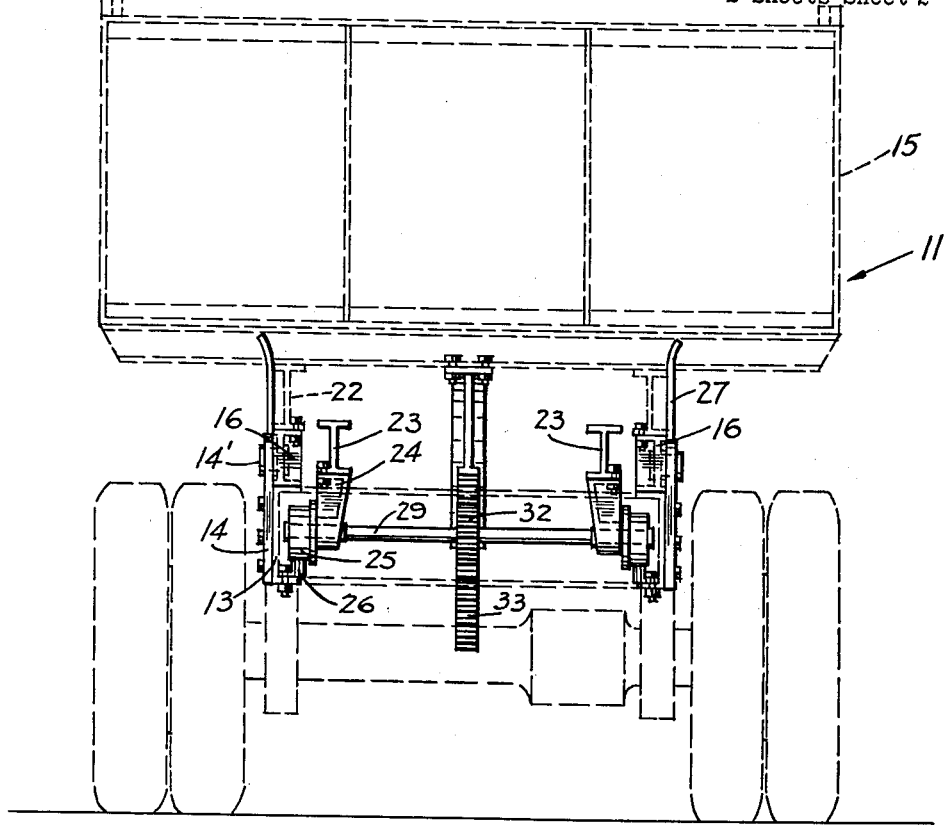
FIG. 2
FIG. 3
FIG. 4
INVENTOR.
BENJAMIN E. SYKES
BY
ATTORNEYS United States Patent Office 2,739,837
Patented Mar. 27, 1956

2,739,837

TRAVEL HOIST CARRIAGE FOR DUMP TRUCKS

Benjamin E. Sykes, Sacramento, Calif.

Application August 13, 1954, Serial No. 449,621

3 Claims. (Cl. 298—22)

This invention relates to dumping vehicles, such as dump trucks or the like, and more particularly to an improved means for providing a desired "overhang" of a dump truck body beyond the rear wheels of the truck when the dump body is elevated for discharging the contents thereof.

A main object of the invention is to provide a novel and improved dumping vehicle wherein the dump body portion thereof is normally carried forwardly of the rear wheels of the truck and wherein said body is moved rearwardly to provide a desired "overhang" of the dump body when the body is elevated for discharging the contents thereof, the improved vehicle being simple in construction, being reliable in operation, and operating automatically to move the dump body rearwardly when said dump body is elevated to dumping position.

A further object of the invention is to provide an improved dump truck having a dump body of the toting type, the dump truck involving inexpensive components, being durable in construction, and being arranged so that it will carry a maximum pay load while at the same time providing an efficient dumping action by causing the dump body to move rearwardly responsive to the elevation of said body to dumping position.

Further objects and advantages of the invention will become apparent from the following description and claims, and from the accompanying drawings, wherein:

Figure 2 is a rear elevational view of the mechanism taken on line 2—2 of Figure 1;

Figure 3 is a transverse vertical cross sectional view taken on line 3—3 of Figure 1; and Figure 4 is an enlarged cross sectional detail view taken on line 4—4 of Figure 1.

Figure 1:
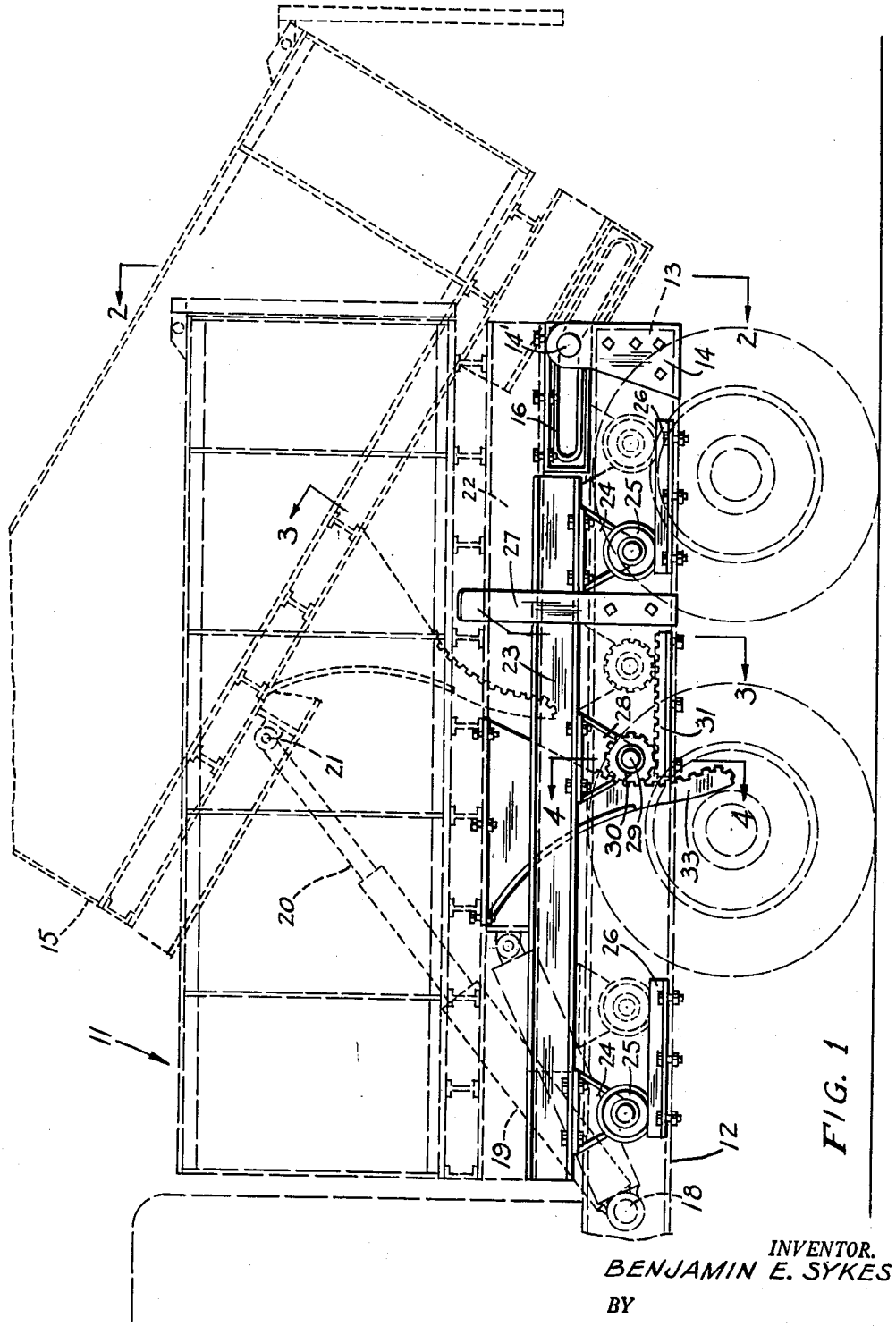
Figure 1 is a side elevational view illustrating the improved dump body controlling mechanism of the present invention, shown mounted on a conventional truck, the truck being shown in dotted view.

Referring to the drawings, 11 designates in dotted view a conventional truck which is provided with the main body 12. Said main body includes the respective longitudinal channels 13 which are rigidly secured in parallel relationship and which have secured to their rear ends the upstanding lug members 14, each lug member being provided at its top end with a transversely extending pivot pin 14'. The truck body, designated 15, is supported on a suitable frame and secured to the rear end portion of the body 15 are the respective longitudinally slotted rectangular depending plate members 16, 16. The pivot members 14' extend through the slots in the plate members 16, whereby the body 15 may be moved longitudinally and may also rotate around the transversely aligned pivot members 14', as will be presently described.

Pivoted at 18 to the frame 12 of the truck is a conventional hydraulic cylinder 19 provided with extensible piston member 20 which is pivotally connected at 21 to the forward bottom portion of the dump body 15 in a conventional manner.

Designated at 22 is a subframe which is mounted for longitudinal movement relative to the main frame 12, said subframe comprising the parallel longitudinal I-beams 23 which may be suitably rigidly connected, the I-beams 23 having secured thereto the depending brackets 24, 24 on which are journaled respective rollers 25 supported on longitudinal angle bars 26 secured to the main longitudinal beams 13 of the truck body 12, for example, secured on the bottom flanges of the channel members 13, the rollers 25 being received within said channel members.

Respective upstanding guide bars 27 are secured to the channel members 13 on the opposite sides of the main frame 12, said upstanding guide bars 27 engaging the bottom supporting frame portion of the dump body 15 to guide said dump body for longitudinal movement relative to the main frame 12 of the truck.

Secured to the intermediate portions of the respective I-beams 23 are the depending brackets 28, and journaled in the lower portions of said brackets 28 is a transversely extending shaft 29 having the respective gears 30, 30 secured to its opposite end portions. The gears 30 mesh with respective rack bars 31 secured on the bottom flanges of the longitudinal main channel bars 13. Secured on the intermediate portion of the shaft 29 is a gear 32 which is in meshing engagement with a depending arcuate rack bar 33 secured to the underside of the dump body 15.

As shown in Figure 1, the arcuate rack bar 33 has its center substantially at the pivot axis defined by the studs 14', 14', sufficient play being provided between the various parts to allow the dump body 15 to be elevated around the pivotal axis defined by the studs 14' and at the same time to allow the arcuate rack bar 33 to remain in meshing engagement with the gear 32 while the body 15 is being moved rearwardly by the cooperation of the gears 30 with the rack bar 31.

Thus, as the forward end of dump body 15 is elevated by the extension of the piston member 20 from the cylinder 19, the arcuate rack bar 33 rotates the gear 32, causing the shaft 29 to rotate and causing the gears 30 to travel rearwardly along the rack bars 31. This causes the frame 22 to move rearwardly, causing the truck dump body 15 to be moved rearwardly while the forward end of said body is being elevated toward the elevated position thereof shown in Figure 1. Thus, when the dump body is elevated to dumping position, it is moved rearwardly to provide a desired rearward overhang of the rear end of the dump body with respect to the truck main body, facilitating the discharge of the contents of the dump body into the receiving container, and enabling the contents of the dump body to be discharged without spilling same between the truck and the receiving container.

When the body 15 is lowered, the gear teeth on the lower end of the depending arcuate rack bar 33 first engage with the gear 32 and cause the shaft 29 to be rotated, the continued lowering of the dump body causing the gears 30 to travel forwardly on the rack bars 31 and return the subframe 22 towards its original position. At the same time, the dump body 15 is moved forwardly toward its original position by the engagement of the upper portions of the rack bar 33 with the gear 32, the upper portion of the rack bar 33 being suitably shaped to cause the dump body 15 to return to its original position as it is lowered. In the final position of the dump body, namely, when it is returned to its original position, the pivot studs 14' are located substantially in the rear ends of the longitudinal slots in the plate members 16.

From the above, it will be seen that the dump body will be normally carried in a position wherein its load is located forwardly of the rear end of the truck frame, namely, without "rear overhang," but when the body 15 is elevated to dumping position, said body will be moved rearwardly to provide the desired overhang for efficient discharge of the contents of the body.

While a specific embodiment of an improved dumping vehicle has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a dumping vehicle, a main body, a horizontal frame, means rollably supporting said frame on said main body for horizontal longitudinal rolling movement thereon, a dump body, means slidably and pivotally connecting said dump body to the rear end of said main body for longitudinal sliding movement and rotation around the rear end of said main body, means formed and arranged to elevate the forward end of said dump body relative to said main body, a depending member on the dump body, and a rotary member on the frame engaged by said depending member and engaging said main body, said rotary member being arranged to cooperate with the main body to move said frame rearwardly responsive to the elevation of said dump body, whereby the rear portion of said dump body is moved rearwardly beyond the rear end of said main body when the forward portion of said dump body is elevated.

2. In a dumping vehicle, a main body, a horizontal frame, means rollably supporting said frame on said main body for horizontal longitudinal rolling movement thereon, a dump body, means slidably and pivotally connecting said dump body to the rear end of said main body for longitudinal sliding movement and rotation around the rear end of said main body, means formed and arranged to elevate the forward end of said dump body relative to said main body, a transverse shaft journaled to said frame, a longitudinal rack on said main body, a rack gear on said shaft meshing with said rack, and means depending from said dump body and meshingly engaging said rack gear, said last-named means being arranged to rotate said shaft responsive to the elevation of said dump body, whereby the rear portion of said dump body is moved rearwardly beyond the rear end of said main body when the forward portion of said dump body is elevated.

3. In a dumping vehicle, a main body, a horizontal frame, means rollably supporting said frame on said main body for horizontal longitudinal rolling movement thereon, a dump body, means slidably and pivotally connecting said dump body to the rear end of said main body for longitudinal sliding movement and rotation around the rear end of said main body, means formed and arranged to elevate the forward end of said dump body relative to said main body, a transverse shaft journaled to said frame, a longitudinal rack on said main body, a rack gear on said shaft meshing with said rack, an additional rack gear on said shaft, and a depending arcuate rack bar on said dump body meshing with said second named rack gear and being arranged to rotate said shaft responsive to the elevation of said dump body, whereby the rear portion of said dump body is moved rearwardly beyond the rear end of said main body when the forward portion of said dump body is elevated.

References Cited in the file of this patent
UNITED STATES PATENTS 1,529,479    Furr _____ Mar. 10, 1925
1,831,154    Winn _____ Nov. 10, 1931